US010127581B2

(12) United States Patent
Silverman et al.

(10) Patent No.: US 10,127,581 B2
(45) Date of Patent: Nov. 13, 2018

(54) RISK PREMIUMS FOR CONVERSION-BASED ONLINE ADVERTISEMENT BIDDING

(71) Applicant: Google LLC, Mountain View, CA (US)

(72) Inventors: Andrew E. Silverman, New York, NY (US); Kai Chen, San Bruno, CA (US); Abhinay Sharma, Los Altos, CA (US); Scott S. Benson, Sunnyvale, CA (US); James A. Gallagher, Mountain View, CA (US); Markus Mock, Cupertino, CA (US); Bhavesh R. Mehta, Cupertino, CA (US); Nicholas C. Fox, San Francisco, CA (US); Angshuman Guha, Los Gatos, CA (US); Tomas Lloret Llinares, Mountain View, CA (US)

(73) Assignee: Google LLC, Mountain View, CA (US)

( * ) Notice: Subject to any disclaimer, the term of this patent is extended or adjusted under 35 U.S.C. 154(b) by 407 days.

(21) Appl. No.: 14/733,714

(22) Filed: Jun. 8, 2015

(65) Prior Publication Data

US 2015/0348139 A1    Dec. 3, 2015

Related U.S. Application Data

(63) Continuation of application No. 12/397,524, filed on Mar. 4, 2009.

(51) Int. Cl.
| | |
|---|---|
| *G06Q 30/00* | (2012.01) |
| *G06Q 30/02* | (2012.01) |
| *G06Q 30/06* | (2012.01) |
| *G06Q 40/00* | (2012.01) |

(52) U.S. Cl.
CPC ......... *G06Q 30/0275* (2013.01); *G06Q 30/02* (2013.01); *G06Q 30/0276* (2013.01); *G06Q 30/0601* (2013.01); *G06Q 40/12* (2013.12)

(58) Field of Classification Search
None
See application file for complete search history.

(56) References Cited

U.S. PATENT DOCUMENTS

| | | |
|---|---|---|
| 2003/0009495 A1 | 1/2003 | Adjaoute |
| 2003/0033292 A1 | 2/2003 | Meisel et al. |
| 2005/0055269 A1 | 3/2005 | Roetter et al. |
| 2005/0160002 A1 | 7/2005 | Roetter et al. |
| 2005/0273388 A1 | 12/2005 | Roetter |
| 2006/0069614 A1 | 3/2006 | Agarwal et al. |
| 2006/0122879 A1 | 6/2006 | O'Kelley |
| 2006/0184417 A1* | 8/2006 | Van der Linden ..... G06Q 30/02 705/14.46 |

(Continued)

OTHER PUBLICATIONS

Office Action issued in Canadian Application No. 2,754,463 dated May 13, 2016, 3 pages.

(Continued)

*Primary Examiner* — Matthew T Sittner
(74) *Attorney, Agent, or Firm* — Fish & Richardson P.C.

(57) ABSTRACT

An advertiser specifies a conversion-based bid for a conversion event associated with an ad. If a conversion event occurs for the ad, an effective conversion-based bid can be adjusted by a risk premium associated with the ad. An account associated with the advertiser can be debited based upon the adjusted effective conversion-based bid.

22 Claims, 6 Drawing Sheets

(56) References Cited

U.S. PATENT DOCUMENTS

| | | |
|---|---|---|
| 2007/0067215 A1 | 3/2007 | Agarwal et al. |
| 2007/0156887 A1 | 7/2007 | Wright et al. |
| 2007/0198350 A1 | 8/2007 | O'Kelley et al. |
| 2007/0239527 A1 | 10/2007 | Nazer et al. |
| 2008/0046316 A1 | 2/2008 | Shah et al. |
| 2008/0086368 A1 | 4/2008 | Bauman et al. |
| 2008/0103952 A1* | 5/2008 | Flake ............ G06Q 20/102 705/37 |
| 2009/0043648 A1* | 2/2009 | Mandian ........... G06Q 30/02 705/14.39 |
| 2009/0106100 A1 | 4/2009 | Mashinsky |
| 2010/0228636 A1* | 9/2010 | Silverman ......... G06Q 30/02 705/14.72 |
| 2015/0348139 A1* | 12/2015 | Silverman ......... G06Q 30/02 705/14.71 |

OTHER PUBLICATIONS

U.S. Appl. No. 10/712,263, filed Nov. 14, 2003, Targeting Advertisements Based on Predicted Relevance of the Advertisements, Jeremy Bern et al.

U.S. Appl. No. 11/688,787, filed Mar. 20, 2007, Value-Based Bidding for Online Advertising, Pearl Renaker et al.

International Search Report and Written Opinion in PCT/US2010/026115, dated Apr. 28, 2010, 9 pages.

International Preliminary Report on Patentability in PCT/US2010/026115, dated Sep. 6, 2011, 8 pages.

\* cited by examiner

Google™ AdWords tester@gmail.com | 2 New Features! | Help | Contact Us | Sign Out

| Campaign Management | Reports | Analytics | My Account | Print Ads |

Account Snapshot | Campaign Summary | Tools | Conversion Tracking | Ad Creation Marketplace    Search my campaigns: [    ] Search    Advanced Search Campaign Summary > Summer Sale > Edit Campaign Settings > Bidding Options > Set Bids

Summer Sale: Set Bids

What's the most you want to pay for a conversion? By entering this information below, you'll enable CPA bidding for this campaign. Depending on your current mode, you can pay either when a click occurs or when a conversion occurs. Based on the current data we have for your account, you'll start in the 'Bidding by CPA, paying per click' mode.

Note: In some campaigns, you may be asked to provide an estimated conversion rate. This campaign already has sufficient information, so an estimated conversion rate isn't needed

1. Choose what you want to enter bids for.

● Bid the same amount for any conversion on an action from an ad group. Describe and mention you pay for just the first conversion.

○ Enter different bids for different action conversions from an ad group. Describe and mention you pay for any conversion on one of this account actions.

2. Enter CPA bids.

Stats for Mar 1, 2008 to Mar 31, 2008

| Ad Group Name | Status | Action | Max CPA Bid | Initial CPC ⓘ | Conv. Rate | Avg. CPC | Cost |
|---|---|---|---|---|---|---|---|
| California Hotels | Active | Any action | $ [1.29] Suggestion: $1.29 | « Enter CPA bid | 2.35% | $1.50 | $15.00 |
| Florida Hotels | Active | Any action | $ [  ] Suggestion: $2.50 | « Enter CPA bid | 5.44% | $2.20 | $134.23 |

Set individually | Set all in one box

How does Google calculate suggested maximum CPA bids? | View all suggested bids

« Back   Save Changes

We cannot guarantee that the actual average CPA will always be less than your max CPA bid, but AdWords will adjust your CPC bids over time to honor this limit as closely as possible.

©2007 Google - AdWords Home - Editorial Guidelines - Privacy Policy - Contact Us

RISK PREMIUMS FOR CONVERSION-BASED ONLINE ADVERTISEMENT BIDDING

CROSS-REFERENCE TO RELATED APPLICATION

This is a continuation of U.S. application Ser. No. 12/397,524, filed Mar. 4, 2009, the disclosure of which is hereby incorporated by reference in its entirety.

TECHNICAL FIELD

The subject matter of this application is generally related to online advertising.

BACKGROUND

The rise of the Internet has enabled access to a wide variety of content items, e.g., video and/or audio files, web pages for particular subjects, news articles, etc. Such access to these content items has likewise enabled opportunities for targeted advertising. For example, content items of particular interest to a user can be identified by a search engine in response to a user query. The query can include one or more search terms, and the search engine can identify and, optionally, rank the content items based on the search terms in the query and present the content items to the user (e.g., according to the rank). This query can also be an indicator of the type of information of interest to the user. By comparing the user query to a list of keywords specified by an advertiser, it is possible to provide targeted advertisements to the user.

Another form of online advertising is advertisement syndication, which allows advertisers to extend their marketing reach by distributing advertisements to additional partners. For example, third party online publishers can place an advertiser's text or image advertisements on web pages that have content related to the advertisement. Because the users are likely interested in the particular content on the publisher webpage, they are also likely to be interested in the product or service featured in the advertisement. Accordingly, such targeted advertisement placement can help drive online customers to the advertiser's website.

Advertisers can bid for placements based upon how much the advertiser values the placement. In some examples, the advertiser can bid based upon impressions of the advertisement. In such examples, the advertiser is charged whenever the advertisement is served. In other examples, the advertiser can bid based upon a click-through for the advertisement. In such examples, the advertiser is charged only when a user clicks on the advertisement after the advertisement is served to the user. In some examples, a second price auction can be used to identify a winning bid. In a second price auction, the bidder with the highest bid is identified as the winner. The winning bid is defined as a bid that is incrementally more than the next highest maximum bid. Thus, the winner of the auction pays slightly more than the next highest maximum bid specified by the user. The winning bid is the cost paid by the advertiser for the advertising slot. Thus, the cost to the advertiser is often a discounted value of the maximum bid specified by the advertiser (e.g., Discount=1−Cost/MaxBid).

SUMMARY

An advertiser specifies a maximum conversion based bid (e.g., CPA bid or other target) for a conversion event associated with an ad. A determination can be made as to whether the maximum conversion based bid qualifies the advertisement for a placement. If a conversion from the placement is identified, an effective conversion based bid can be adjusted using a risk premium associated with the online advertisement. The effective conversion-based bid can be derived from the specified maximum conversion based bid for the advertisement. An account associated with the advertiser can be debited by the adjusted effective conversion-based bid.

DESCRIPTION OF DRAWINGS

FIG. 3 illustrates an implementation of a user interface for setting conversion based bids.

DETAILED DESCRIPTION

Advertising System Overview

Figure 1:
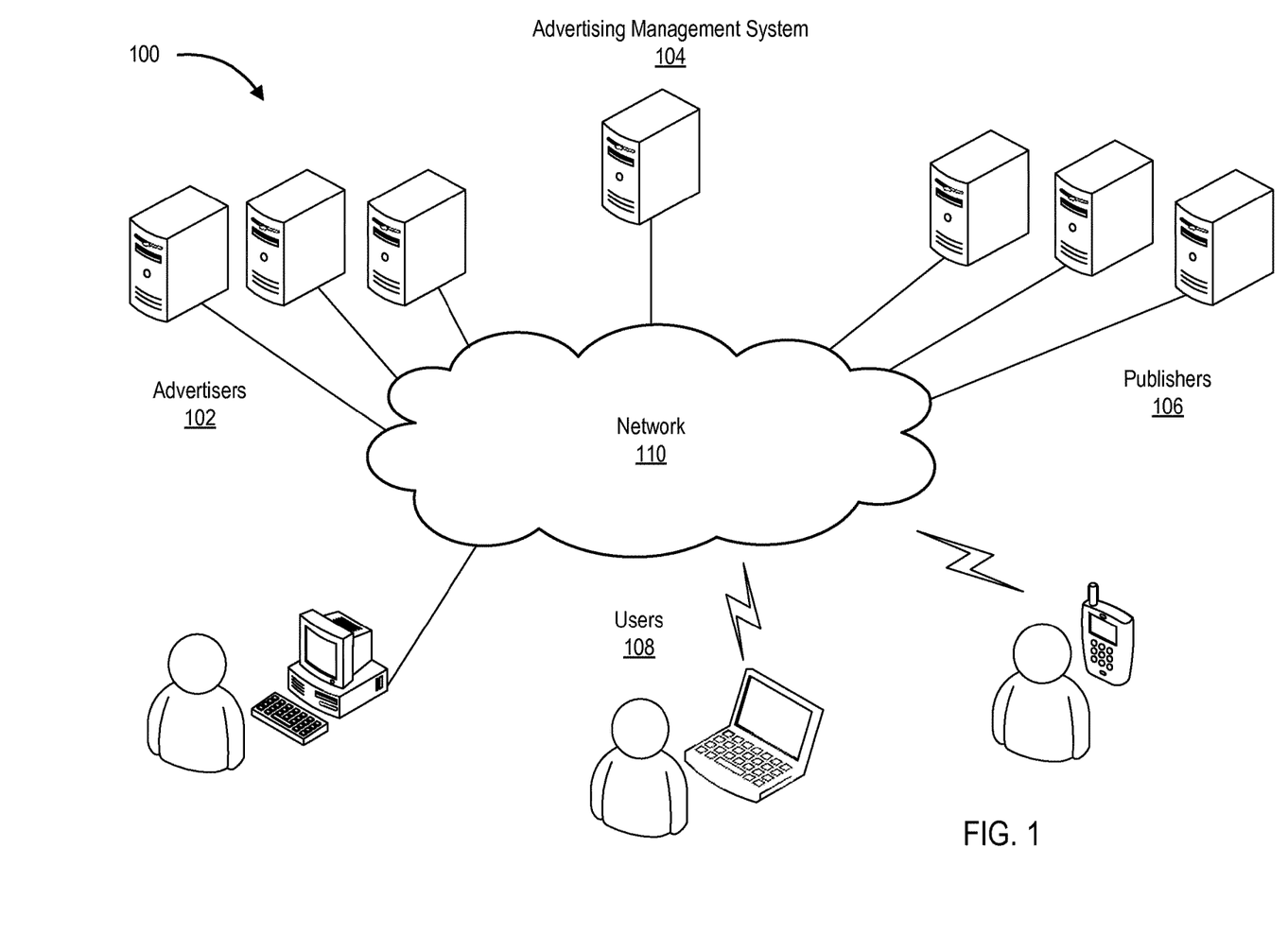
FIG. 1 is a block diagram of an implementation of an online advertising system.

FIG. 1 is a block diagram of an implementation of an online advertising system 100. In some implementations, one or more advertisers 102 can directly, or indirectly, enter, maintain, and track advertisement ("ad") information in an advertising management system 104. The ads may be in the form of graphical ads, such as banner ads, text only ads, image ads, audio ads, video ads, ads combining one of more of any of such components, etc. The ads may also include embedded information, such as a links, meta-information, and/or machine executable instructions. One or more publishers 106 may submit requests for ads to the system 104. The system 104 responds by sending ads to the requesting publisher 106 for placement on one or more of the publisher's web properties (e.g., websites and other network-distributed content).

Other entities, such as users 108 and the advertisers 102, can provide usage information to the system 104, such as, for example, whether or not a conversion or click-through related to an ad has occurred. This usage information can include measured or observed user behavior related to ads that have been served. The system 104 performs financial transactions, such as crediting the publishers 106 and charging the advertisers 102 based on the usage information.

A computer network 110, such as a local area network (LAN), wide area network (WAN), the Internet, or a combination thereof, connects the advertisers 102, the system 104, the publishers 106, and the users 108.

One example of a publisher 106 is a general content server that receives requests for content (e.g., articles, discussion threads, music, video, graphics, search results, web page listings, information feeds, etc.), and retrieves the requested content in response to the request. The content server may submit a request for ads to an ad server in the system 104.

The ad request may include a number of ads desired. The ad request may also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the ads provided by the system 104. This combined content and ads can be sent to the user 108 that requested the content for presentation in a viewer (e.g., a browser or other content display system). The content server can transmit information about the ads back to the ad server, including information describing how, when, and/or where the ads are to be rendered (e.g., in HTML or JavaScript™).

Another example publisher 106 is a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and may be grouped into a predetermined number of (e.g., ten) search results.

The search service can submit a request for ads to the system 104. The request may include a number of ads desired. This number may depend on the search results, the amount of screen or page space occupied by the search results, the size and shape of the ads, etc. In some implementations, the number of desired ads will be from one to ten, or from three to five. The request for ads may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search service can combine the search results with one or more of the ads provided by the system 104. This combined information can then forwarded to the user 108 that requested the content. The search results can be maintained as distinct from the ads, so as not to confuse the user between paid advertisements and presumably neutral search results.

Finally, the search service can transmit information about the ad and when, where, and/or how the ad was to be rendered back to the system 104.

As can be appreciated from the foregoing, the advertising management system 104 can serve publishers 106, such as content servers and search services. The system 104 permits serving of ads targeted to documents served by content servers. For example, a network or inter-network may include an ad server serving targeted ads in response to requests from a search service with ad spots for sale. Suppose that the inter-network is the World Wide Web. The search service crawls much or all of the content. Some of this content will include ad spots (also referred to as "inventory") available. More specifically, one or more content servers may include one or more documents. Documents may include web pages, email, content, embedded information (e.g., embedded media), meta-information and machine executable instructions, and ad spots available. The ads inserted into ad spots in a document can vary each time the document is served or, alternatively, can have a static association with a given document.

In some implementations, the system 104 includes a value-based bidding system which predicts or estimates a conversion rate and conversion value of a given ad impression for an advertiser 102 using conversion data and ad impression context, as described in reference to FIGS. 2-5. In further implementations, the system 104 includes a risk premium adjustment system used to adjust price paid by the advertiser 102 to account for the risk associated with misprediction of click-through and/or conversion rates, or the risk that an advertiser 102 will hide conversions through underreporting or adjustment of conversion parameters.

User Interface Examples

Figure 2:
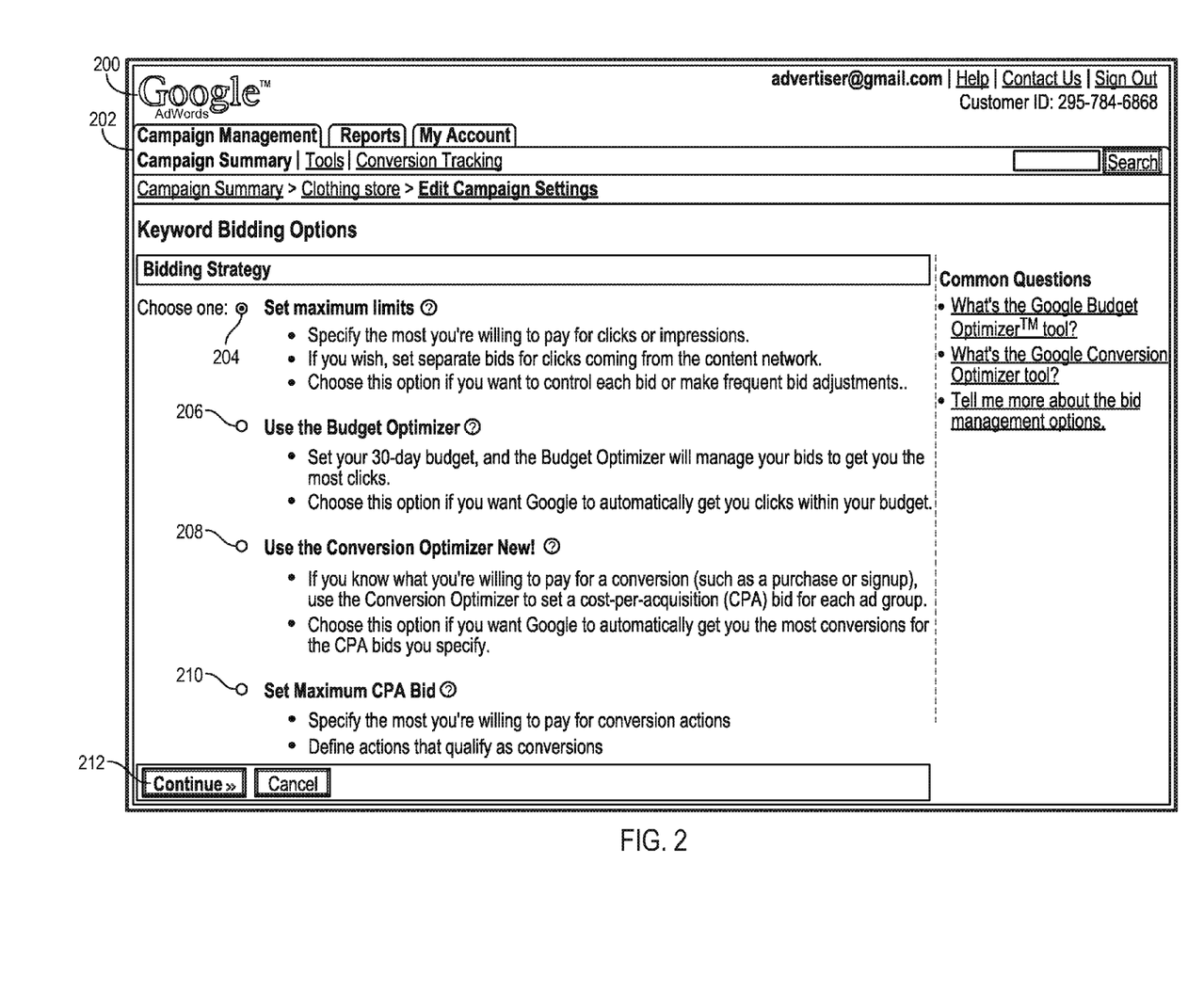
FIG. 2 illustrates an implementation of a user interface for specifying keyword bidding options.

FIG. 2 illustrates an implementation of a user interface 200 for specifying keyword bidding options. In some implementations, advertisers can interact with an online ad targeting service (e.g., ad management system 104) through the user interface 200. In this particular implementation, the user interface 200 includes a campaign management tab 202 which presents several bidding strategy options that can be selected by the advertiser using a mouse or other input device.

A first option 204 allows the advertiser to specify a maximum monetary value the advertiser is willing to pay for a click or impression. The advertiser can choose the first option 204 to control each bid or make frequent bid adjustments. A second option 206 allows the advertiser to set a 30-day budget and to manage bids to get the most clicks. The advertiser can choose the second option 206 to automatically get clicks within the advertiser's budget. A third option 208 allows the advertiser to set a target bid (e.g., CPA target) for each of the advertiser's keywords/ad groups. The advertiser can choose the third option 208 to automatically get the most conversions for the advertiser's target bid and to implement automated value-based bidding. The advertiser can choose a fourth option 210 to set a conversion-based bid. The advertiser can use the fourth option to pay only for sales, thereby being able to compare the advertisement cost directly to a sale. As shown in FIG. 2, the user can select an option by first clicking on a bubble or other user interface element (e.g., a button), then clicking a "Continue" button representation 212 to receive a new dialog.

Although the user interface 200 allows for specifying a CPA target, other target metrics are possible, such as Return-On-Advertising Spend (ROAS), Return-On-Investment (ROI) and any other appropriate metrics.

FIG. 3 illustrates an implementation of a user interface 200 configured for setting conversion-based bids upon the selection of the conversion-based bidding option of FIG. 2 (e.g., fourth option 210). A similar interface can be provided upon selection of the target bidding option in FIG. 2 (e.g., third option 208).

In this particular implementation of the user interface 200, the campaign management tab 202 presents a new dialog in response to the advertiser clicking/selecting the third option 208 and clicking the "Continue" button representation 212 in the previous dialog shown in FIG. 2. In some implementations, the new dialog includes two tabs: a "Set Individually" tab 300 for allowing a user to edit ad groups individually and an "Edit all in one box" tab 303 for allowing the user to edit all ad groups with a single box. In the example shown, the "Edit Individually" tab 300 is selected by the advertiser. The tab 300 allows the advertiser to set a CPA target for each of the advertiser's ad groups. If an ad group has insufficient conversion data available to generate a meaningful prediction of its conversion rate, then a default Max CPC bid specified by the advertiser can be used.

In the example shown, the advertiser has two active ad groups 306: "California Hotels" and "Florida Hotels." Tab 303 allows the user to input a single CPA target for all the advertiser's ad groups 306. The advertiser can separately specify a different CPA bid for each ad group 306 using text boxes 308. When the CPA is specified, the advertiser can click the Save Changes button representation 310 to save the bids and activate the campaign. The remainder of the tab 300 is used to present campaign data, such as the number of clicks or impressions, click-through-rate (CTR), average CPC, cost, conversion rate, etc.

Of particular interest in the tab 300 is the presentation of a recommended CPA bid 312 for providing the advertiser with guidance in selecting a CPA bid. The recommended CPA bid is theoretically equivalent to the advertiser's current CPC bids. For example, if the advertiser currently has a CPC bid of $0.30 and a conversion rate of 5%, the recommended CPA bid for conversions would be $6.00 ($6.00*5%=$0.30). In practice the advertiser's current CPC bids will typically vary from ad to ad and from keyword to keyword for a single ad. In such cases, the recommended CPA bid for a conversion event can be computed using $$CPA = \frac{\sum_{i=1}^{N} \text{Max}CPCbid_i}{\sum_{i=1}^{M} Conversions_i}, \quad (1)$$

where the numerator of [1] is the sum of N Max CPC bids over all the clicks that the advertiser received during a relevant period of time (e.g., over the past month), and the denominator of [1] is the total number of conversions M that resulted from these clicks.

It should be noted that the user interfaces 200 shown in FIGS. 2 and 3 are merely examples, and other user interfaces having more or fewer user interface elements, or different user interface elements, can be used to provide advertisers access to the functionality described herein.

Advertising Management System for
Conversion-Based Bidding

Figure 4:
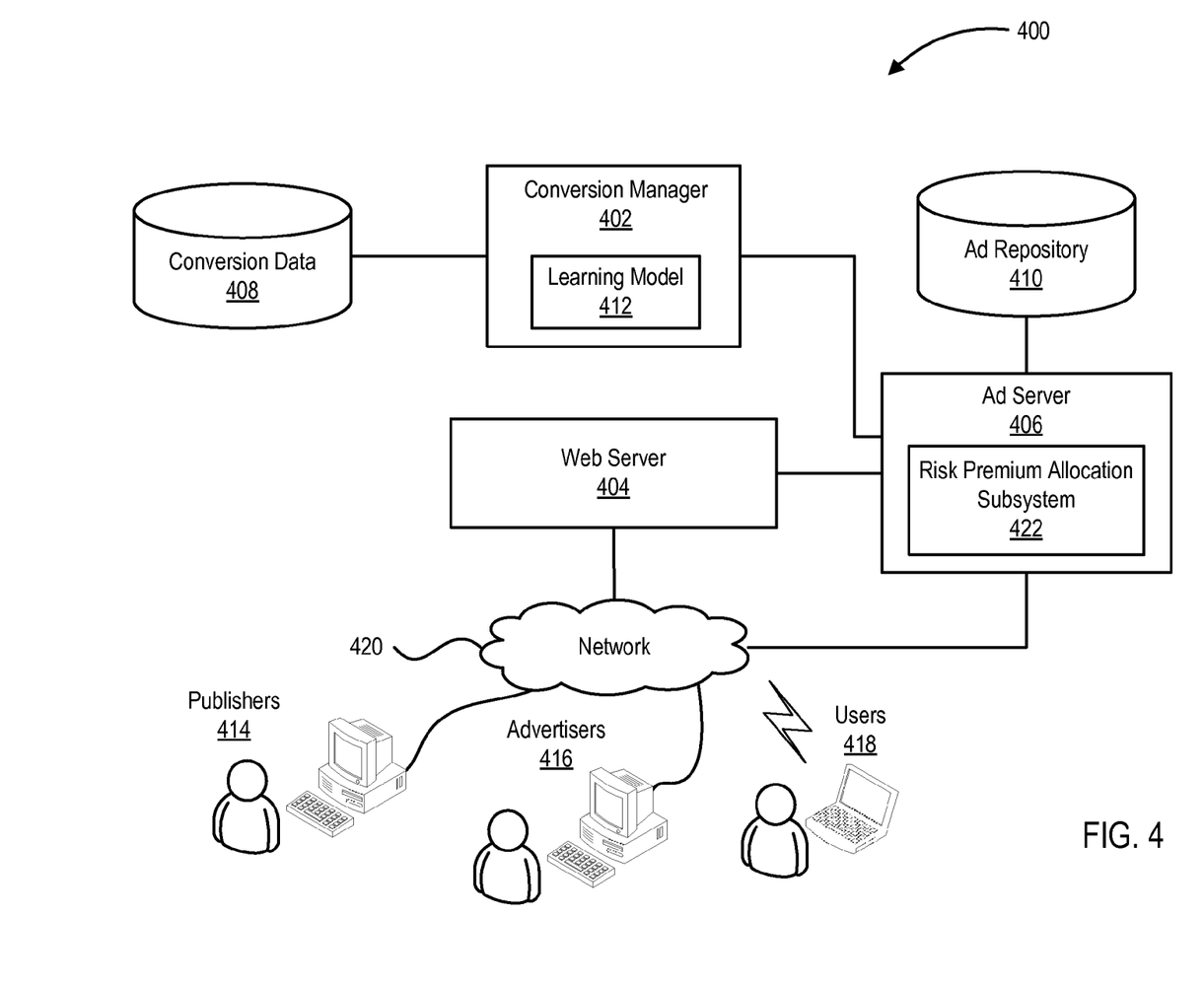
FIG. 4 is a block diagram of an implementation of an advertising management system for implementing value-based bidding with risk premium allocation.

FIG. 4 is a block diagram of an implementation of an ad management system 400 for implementing conversion-based bidding. In some implementations, the system 400 generally includes a conversion manager 402, a web server 404, and an ad server 406. The system 400 is operable to communicate with publishers 414, advertiser 416 and users 418, over one or more networks 420 (e.g., the Internet, intranet, Ethernet, wireless network).

In some implementations, a publisher 414 can request an ad from the ad server 406. In response to the request, one or more ads (e.g., image ads) are sent to the publisher 414. The advertisements sent to the advertisers can be selected based upon an auction (e.g., a second price auction). In those instances where the bids are based upon multiple bidding paradigms (e.g., CPA, CPC, CPM), the bids can be converted to a common bidding paradigm and the winning bid can be identified. In those implementations where a CPA bid is included in the auction, the CPA based bid can be converted to a CPM or CPC based maximum bid. If the converted bid wins the auction, a winning bid can be identified as a bid that is incrementally more than the next highest maximum CPM or CPC based bid.

The ad(s) can be placed on, for example, a web property owned or operated by the publisher 414 (e.g., a web site). In some implementations, the web page can have a page content identifier (ID), which can be used by the ad server 406 to determine ad context for targeting ads that the user 418 will be receptive to. In some implementations, the ad context can be determined using clustering technology and geographic location data.

In some implementations, when the user 418 clicks an ad served by the ad server 406, the user 418 is directed to a landing page on web property (e.g., a web site) of the advertiser 416. The user 418 may then perform a conversion event at the website (e.g., make a purchase, register). The conversion event generates conversion data which is sent to the system 400 and stored in a repository 408 (e.g., MySQL® database). In this manner, a conversion history can be accumulated and maintained for each ad or ad group in an advertiser's ad campaign.

If the winning bid was a conversion based bid, the winning bid can be converted to a CPA based winning bid and the advertiser can be charged the price associated with the CPA based winning bid. Alternatively, a discount can be calculated from the converted maximum CPM or CPC based bid (e.g., Discount=1−(WinningBid/ConvertedMaxBid)). The calculated discount can then be applied to the maximum CPA bid to identify the cost charged to the advertiser for the conversion.

Another approach to identifying the cost charged to the CPA based bid is to use an average click auction discount weighted by the predicted conversion rate (e.g., average auction discount over all clicks weighted by predicted conversion rate). One result of computing auction discount in this way is that it equalizes click and conversion costs for an advertiser by accounting for mispredictions associated with the predicted conversion rate. In some implementations, the fact that a CPA based bid wins an auction does not affect a publisher. For example, the publishers can be paid based upon click-through for an advertisement regardless of whether a conversion occurs and the system can assume the risk for misprediction of the conversion rate.

In some implementations, an advertiser 416 can access the system 400 through the network 420 and the web server 404 using, for example, a web browser (e.g., Microsoft® Internet Explorer, Mozilla™, Firefox™, or the like). The web server 404 serves the advertiser 416 one or more web pages presenting a dialog for allowing the advertiser 416 to manage ad campaigns, as described in reference to FIGS. 2 and 3.

In some implementations, the advertiser 416 can use the dialog to specify a default click-based bid (e.g., maximum CPC or "Max CPC") and a target bid (e.g., "CPA target" or "ROAS target") for each keyword or ad group in an ad campaign. The default Max CPC can be used to predict a conversion rate for an ad or ad group when there is insufficient conversion data available (e.g., a new ad or ad group). For example, a conversion rate can be estimated by dividing a default Max CPC bid by a target CPA bid. Alternatively, the default Max CPC can be used instead of predicting a conversion rate when there is insufficient information to do so.

In some implementations, the maximum cost per action (CPA) (e.g., conversion) can be modified by a risk premium allocation subsystem 422 to identify a target maximum CPA bid. The risk premium allocation subsystem 422 can adjust the maximum CPA bid to account for the risk associated with misprediction of click-through and/or conversion rates, or the risk that an advertiser will hide conversions through underreporting or adjustment of conversion parameters. For example, the maximum CPA bid specified by the advertiser can be discounted by the premium prior to submitting the bid for participation in an auction (e.g., a second-price auction). Such discounting of the maximum CPA bid facilitates the application of a risk premium to be levied on a winning bid by the risk premium allocation subsystem 422 after a conversion is identified without exceeding the maximum CPA bid specified by the advertiser. Using such application of a risk premium, the full amount of the risk premium can be recouped. However, such application of the risk premium can affect the traffic distribution for advertisements, thereby affecting return on investment.

Moreover, if the CPA bid is discounted by the risk premium, the price of the advertisement slot might be reduced, thereby reducing revenue for publishers and advertising servers, while maintaining the same cost to the advertiser. For example, in these models there are two cases: 1) when *all* advertisers are paying a premium (Ad Exchange model), and 2) where only a *subset* of advertisers are paying a premium (the case for CO). These cases can be very different. In the first case when you are reducing the bid for all advertisers, there is probably no issue with reduced spending because you are applying a multiplier to all bids in the auction. In the second case, while computing the auction price (e.g., winning bid) and ranking, one can identify a total opportunity cost for placing the advertisement (which is actual_MaxCPC*pCTR) at a specific slot, rather than the reduced_MaxCPC*pCTR. This can also show decreased spending in the auction, because an advertiser not paying the premium whose bid is now above the advertiser paying the premium now pays less than the total opportunity cost.

As an example, consider an auction for which four ads (A, B, C, and D) are competing for three slots. Assuming equal pCTR, the ads can be ranked by MaxCPC. In this example, ad A has a maximum CPC of 9, ad B has a maximum CPC of 8, ad C has a maximum CPC of 7.5 and ad D has a maximum CPC of 5. The ranking of the advertisements can be identified, in order, as A, B, C and D, and the total expected revenue for the auction would be the sum of the three lowest bids, or 20.5 (e.g., 8+7.5+5=20.5). If the bid for advertisement B is reduced by 10% based on the risk premium, the new ranking would be A: 9, C: 7.5, B: 7.2 and D: 5. The total expected revenue can be calculated as: 7.5+(7.2+0.80)+5=20.5 which appears to be the same as the expected revenue with no bid modification. However, this assumes that the CTR is the same across all slots. In practice this assumption is not true. Higher ordered ad slots have a higher CTR. So the above case leads to reduction in revenue. Moreover, there is a defined reduction in revenue if the ad due to reduced bid drops out of the auction.

In other implementations, a risk premium can be charged post auction. For example, the risk premium can be charged as part of the auction discount. In such implementations, the fee can be charged such that the CPA does not exceed the maximum CPA bid specified by the advertiser. However, because the amount risk premium is a function of the auction discount, because the cost is capped at the maximum CPA bid, the risk premium will vary based upon the auction. Such application of the risk premium would produce no change in the traffic distribution, since the maximum CPA bid is not adjusted prior to conversion to CPC or CPM based bids. If the average difference between the winning CPA and the maximum CPA is lower than the risk premium, the fees can be recuperated from the advertiser and the net revenue for the advertising system increases by the percentage added by the risk premium without change in traffic distribution. In those instances where the average difference between the winning CPA and the maximum CPA bid is less than the risk premium, some implementations can exclude such advertisers from participation.

In some implementations, the target CPA bid specified by the advertiser 416 and as modified by the risk premium allocation subsystem 422 is provided by the ad server 406 to the conversion manager 402 where it can be combined with a predicted conversion rate to produce a new or adjusted Max CPC bid. In some implementations, the conversion manager 402 includes a learning model 412, which can be built from the conversion data and other information (e.g., how a particular query converts across all advertisers). During, for example, an ad auction, the learning model 412 can be used to predict a conversion rate for a potential ad impression. A conversion rate measures how many visits to a web property "convert" to a sale or "action" as defined by the advertiser. The conversion rate metric is generally given by $$\text{Conversion Rate} = \frac{\text{\# of sales from a given ad}}{\text{\# of visits to web property from ad}}. \quad (2)$$

In some implementations, the learning model 412 is a machine learning system model that includes rules for mapping impression context features to conversion rate predictions. For example, the learning model 412 may include, but is not limited to, the following rules:
  ad appears on America Online® (AOL): probability multiplier=1.1
  user is from USA: probability multiplier=0.85
  user is from UK: probability multiplier=0.95
  Time of day 9 am-noon: probability multiplier=0.9

Using these rules, if an ad is shown on AOL to a user from the United Kingdom (UK) at 10:00 AM, then the default conversion rate from [2] would be multiplied by the probability multipliers 1.1, 0.95 and 0.9, corresponding to the impression context features AOL, UK and time of day, respectively. Thus, if the default conversion rate is 0.2, then the conversion rate prediction for ads satisfying the rules would be (0.2*1.1*0.95*0.9)=18.81%.

Similarly, if the same ad is shown on AOL to a user in the United States at the same time, then the default conversion rate computed in [2] would be multiplied by the probability multipliers 1.1, 0.85 and 0.9, corresponding to the impression context features: AOL, USA and time of day, respectively. Thus, if the default conversion rate for the ad is 0.2, then the conversion rate prediction for ads satisfying the rules would be (0.2*1.1*0.85*0.9)~16.8%.

In some implementations, the rules used by the learning model 412 can be specific to a particular ad. For example, the learning model 412 may include the following rules for a fictitious "ad 17354" for a London restaurant:
  showing ad 17354 to a user from USA: probability multiplier=0.5 showing ad 17354 to a user from UK: probability multiplier=3.0.

In the examples shown, the computation could also be performed in terms of odds rather than probabilities since odds have better behaved mathematical properties. For example, with odds one can avoid problems associated with a probability greater than one.

Techniques for deriving rules from conversion data using machine learning systems is described in U.S. patent application Ser. No. 10/712,263, for "Targeting Advertisements Based on Predicted Relevance of the Advertisements," and U.S. patent application Ser. No. 11/321,046, for "Predicting Ad Quality."

In some implementations, the predicted conversion rate (pCVR) can be used to compute or adjust an advertiser's click-based bid (e.g., Max CPC bid). For example, if the CPA specified by an advertiser is $50 and the predicted conversion rate is 2%, the Max CPC can be automatically adjusted to $1 using the formula $$\text{Max}CPC(\text{adjusted}) = \text{Max}CPA * pCVR. \quad (3)$$

If there is insufficient conversion data available to compute pCVR, then the advertiser's specified default Max CPC can be used as a metric, until sufficient conversion data has been gathered for the ad, at which time [3] can be used to automatically compute or adjust the Max CPC. During the course of an ad campaign, the conversion data (and optionally the learning model) can gradually change over time as more data is accumulated, while the impression context varies from auction to auction. These changes can result in the calculation of a new predicted conversion rate. The new predicted conversion rate can then be used in [3] "on-the-fly," so that the advertiser's default Max CPC bid used in the auction is automatically and continuously computed or adjusted during the ad campaign or auction.

Equation [3] is one example of a formula calculating an adjusted Max CPC. Other formulas are possible that combine a default CPC and confidence information. For example, let V be the number of conversions observed for an ad or ad group (i.e., the amount of conversion data available), and X1 and X2 be threshold values, where X1<X2. Then,
for V<=X1, Max CPC=DefaultCPC;

for X1<V<X2,

Max$CPC=CPA*pCVR*Z$+Default$CPC*(1-Z)$, where
$Z=(V-X1)/(X2-X1)$;

and
for V>=X2,

Max$CPC=CPA*pCVR$.

Based on the above equations, a default CPC can be used when V is less than or equal to X1, equation [3] can be used when V is greater than or equal to X2, and a linear blend of the two when V is between X1 and X2. Note that plugging V=X1 or V=X2 into the second formula produces Default-CPC and CPA*pCVR, respectively.

Equation [3] assumes that all conversions for the ad or ad group are the same. If the advertiser does not want to specify a single CPA for all conversions associated with an ad or ad group, then in some implementations, the advertiser can instead specify a target ROAS value for each ad or ad group. In that case, the advertiser should also report back data, such as the value of a conversion event that occurs on its web site as part of the historical conversion data. For example, the value of a conversion can be the dollar amount of the sale of the advertised item (e.g., 199.0 for a $199.00 iPod®).

In some implementations, when a user specifies a maximum ROAS bid based upon conversions, the risk premium allocation subsystem 422 can discount the maximum ROAS bid using a risk premium. The risk premium can be applied to adjust the maximum ROAS bid to account for the risk associated with misprediction of click-through and/or conversion rates, or the risk that an advertiser will hide conversions through underreporting or adjustment of conversion parameters. For example, the maximum ROAS bid specified by the advertiser can be discounted by the risk premium prior to submitting the bid for participation in an auction (e.g., a second-price auction) or conversion to a CPC or CPM based bid for participation in CPC or CPM based auctions, respectively. Such discounting of the maximum ROAS bid facilitates the application of a risk premium to be levied on a winning bid by the risk premium allocation subsystem 422 after a conversion is identified without exceeding the maximum CPA bid specified by the advertiser.

In some implementations, the learning model 412 can predict an expected conversion value (in addition to a predicted conversion rate) and use the predicted conversion value to generate an impression-specific CPC bid. For example, assume the keywords "computer" and "computer accessories" have a conversion rate of 5%, and the average dollar value of a computer sold is $1000 and the average value of a computer accessory sold is $100. If an advertiser has the same profit margins on both items, the advertiser may be willing to pay more to advertise on the keyword "computer" than the keyword "computer accessories." In this example, conversion value is given by $$\text{Conversion Value} = \frac{\$ \text{ value of sales from a given ad}}{\# \text{ times the ad was clicked}}. \quad (4)$$

A ROAS value indicates how many dollars in sales the advertiser wants to generate for each dollar spent on advertising. In this scenario, the total sum of N conversion values, $CV_i$, can be divided by the number of conversions N and the ROAS to get the MaxCPA:

Using [5], if the $$\text{Max}CPA = \frac{\sum_{i=1}^{N} CV_i}{N * ROAS}. \quad (5)$$

advertiser earned $3000 on 50 conversions, and has specified a target ROAS bid of $10, the CPA will be $3000/50/$10=$6.00. Thus, if the advertiser sold $3000 worth of product in 50 transactions, the average sale amount is $60. Assuming a ROAS target of $10, then the advertiser is willing to pay an average of $6 in advertising costs for each conversion. The CPA computed using [5] can then be multiplied by the predicted conversion rate computed using [3] to compute or adjust the advertiser's Max CPC bid.

The example above simplifies and assumes that all conversions have the same value. In some implementations, the learning model 412 is a machine learning system model that includes rules for mapping impression context features to conversion value predictions. For example, the learning model 412 may include, but is not limited to, the following rules:

ad appears on a web site in the "travel" category: value multiplier=1.1;

ad position is "below the fold": value multiplier=0.7;

user is located in San Francisco: value multiplier=0.95; and day of the week is Monday: value multiplier=1.2.

Using these rules, if an ad is shown on a travel site at the bottom of the page to a user from San Francisco on a Monday, then the default conversion value would be multiplied by the value multipliers 1.1, 0.7, 0.95 and 1.2. Thus, if the default conversion value is $18, then the conversion value prediction for ads satisfying the rules would be ($18*1.1*0.7*0.95*1.2)=$15.80.

In some implementations, the predicted conversion value (pCVV) can be used to compute or adjust an advertiser's click-based bid (e.g., Max CPC bid). For example, if the ROAS specified by an advertiser is $10 and the predicted conversion value is $15.80, the Max CPC can be automatically adjusted to be $1.58 using the formula $$\mathrm{Max}CPA = pCVV/ROAS. \quad (6)$$

ROAS can be used directly without CPA. For example, an online travel store could find that people buy more expensive tickets at night (7-11 pm) than in the morning (9 am-noon).

Thus, an advertiser's Max CPC bid for each ad in an auction can be modified dynamically (i.e., on the fly) for each impression context, providing an advantage over conventional systems that only allow advertiser's to make a single, static Max CPC bid for each keyword.

In some implementations, the predicted conversion rate can be used to rank an ad in an auction. A Max Cost-Per-Mille (CPM) can be computed from an expected click-through rate (CTR), CPA bid and predicted conversion rate pCVR. The expected CPM can be used to determine winning bids in an ad auction that ranks ad effectiveness using a suitable metric. For example, the performance of an ad can be measured by an effective cost of one thousand impressions (eCPM) of the ad. That is, the performance of an ad can be measured by the amount of revenue generated by presenting the ad to users one thousand times. The eCPM may be estimated by multiplying the CPA target, the predicted conversion rate, pCVR, and the predicted CTR, pCTR, for that action multiplied by one thousand:

$$eCPM = CPA * pCVR * pCTR * 1000. \quad (7)$$

Machine Learning System Models

Training a machine learning system to accurately predict conversion rates can be difficult due to unreported conversions, which could lead to deflated predictions, conversion latency (e.g., a conversion may occur several weeks after the corresponding click) and the need for a confidence score to translate a conversion rate into a bid.

In some implementations, these effects can be mitigated by training two machine learning models in parallel. A first model ("Model A") would estimate the average conversion rate for each ad group, while a second mode ("Model P") would predict conversion rates for specific ad impressions. The ratio of these two predictions can be used to adjust the ad group's Max CPC, using the formula $$\mathrm{Max}\ CPC(\mathrm{adjusted}) = (\mathrm{default\ Max}\ CPC) * P/A, \quad (8)$$

where P and A are the conversion rate predictions for Model A and Model P, respectively. The ratio P/A will cause any bias that affects both models equally to cancel out.

Normalizing Conversion Events

Because conversions are defined by different advertisers and conversion rates of different ads can differ dramatically, a few ad groups with high conversion rates can dominate the statistics. For example, consider two advertisers, A1 and A2, showing the same ad on two web properties, P1 and P2, respectively, with the clicks and conversions shown in Table I. Advertiser A1 defines every click as a conversion and advertiser A2 defines a conversion as a purchase after each click.

TABLE I

Example Clicks & Conversion for Advertisers A & B

|  | P1 | P2 | Ad Total |
|---|---|---|---|
| A1 | 1000 conversions/1000 clicks = 100% | 100 conversions/100 clicks = 100% | 1100 conversions/1100 clicks = 100% |
| A2 | 1 conversion/100 clicks = 1% | 10 conversions/1000 clicks = 1% | 11 conversions/1100 clicks = 1% |
| Property Total | 1001 conversions/1100 clicks = 90% | 110 conversions/1100 clicks = 10% | |

As shown in Table I, the result is that the overall conversion rate for P1 is much higher than the overall conversion rate for P2, although the only difference between the properties is which ads are shown. This can make it difficult for the learning model to determine what effect the property itself has on conversion rates. The differences in the definitions of a conversion can be equalized by normalizing the conversions.

In some implementations, a process for designing conversion models using normalization and impression context features is described as follows:

1. Identify a set of impression context features that are likely to affect ad conversion rate.

2. Build a first model for predicting an ad's base conversion rate using only ad-related features identified in step 1 (e.g., the number of clicks and conversions as shown in Table I). The ad's base conversion rate can then be used to normalize a conversion rate generated by a second, more detailed, model, as described in step 4.

3. Build a second model for predicting the ad's conversion rate using ad-related and non-ad-related features identified in step 1.

4. When training the model in step 3, normalize each conversion by the ad's base conversion rate predicted by the first model, so that each conversion counts as w conversions, where w=x %/base_conversion_rate. Note that normalizing the conversion rate removes the effect of different conversion definitions by equalizing the effective conversion rate of all ad groups to x % (e.g., 1%).

5. Denormalize the prediction returned by the model by multiplying it by base_conversion_rate/x %. Since the model will produce an average conversion rate of x % for each ad group, the prediction should be multiplied by base_conversion_rate/x % to produce the correct prediction.

In some cases it may be difficult to extract an ad's base conversion rate from its clicks and conversions. In such cases, the ad's base conversion rate can be approximated with the ad's average conversion rate.

Using Statistics to Predict Conversion Rates

In some implementations, a statistics-based approach can be employed to predict conversion rates. In this approach, a machine learning system can be used to collect the number of clicks and conversions for each impression context feature of interest. Statistics (e.g., averages) can then be calculated from these numbers for use in predicting a conversion rate.

Post Auction and Conversion Processing

After performing the auction using the target bid (e.g., maximum CPC, maximum CPM, etc.), the advertising server 406 can detect whether a conversion has been made. In some implementations, a conversion can be detected based upon the insertion of one or more code snippets into an advertiser website, web pages or landing page(s). The inserted one or more snippets of code can detect the completion of a transaction and can communicate the transaction to the ad server 406 and/or conversion manager 402. In other implementations, the conversion can be reported by the advertiser. In various implementations, the risk premium for a conversion can be applied pre-conversion or post-conversion.

Upon receipt of notification that a conversion has been detected, the risk premium allocation subsystem 422 can convert an impression or click based winning bid associated with the conversion to a CPA based winning bid. In those examples where the winning bid is an impression based winning bid (CPM), the impression based winning bid can be divided by an estimated click-through rate to identify an estimated CPC based winning bid. The estimated CPC based winning bid can then be divided by an estimated conversion rate to identify the estimated CPA based winning bid. In those examples where the auction is a CPC based auction, the CPC based winning bid can be divided by an estimated conversion rate to identify the estimated CPA based winning bid.

In some implementations, the risk premium allocation subsystem 422 can multiply the estimated CPA based winning bid by a risk premium to identify a charged cost to the advertiser for the winning bid. In those implementations where the risk premium allocation subsystem 422 discounts the maximum CPA based bid specified by the advertiser by the risk premium prior to submission of the target maximum bid to the auction, a chance that the cost to the advertiser of the conversion exceeds the maximum CPA bid specified by the advertiser is minimized. For example, a CPA based bid of $5.00 can be discounted to account for a risk premium of 20% (e.g., target bid=$5.00/(1+0.2)=$4.17). Thus, if the estimated CPA based winning bid is the target bid, the risk premium can be applied without exceeding the maximum CPA based bid specified by the advertiser (e.g., advertiser cost=$4.17*(1+0.2)=$5.00). In such implementations, the advertiser is allowed to participate in the auction while bearing the full cost of underreporting risk and miscalculation of CTR or conversion rate.

In some implementations, the target maximum bid can be set to be the maximum CPA based bid specified by the advertiser. In such implementations, the risk premium allocation subsystem 422 can apply a risk premium to the estimated CPA based winning bid up to the maximum CPA based bid specified by the advertiser. For example, if the estimated CPA based winning bid is $5.00 and the maximum CPA based bid specified by the advertiser is $5.50, with a risk premium of 20%, the amount charged to the advertiser is capped at $5.50 even though the risk premium would have charged $6.00 to the advertiser in the absence of the $5.50 maximum CPA based bid specified by the advertiser. Thus, a risk premium is charged while maintaining the ability of the advertiser to participate in the auction up to the specified maximum CPA based bid.

In other implementations, the risk premium allocation subsystem 422 can allocate the risk premium by charging a fixed fee or percentage on top of the estimated CPA winning bid. For example, the risk premium allocation subsystem 422 can charge a fee of $1 per conversion. Alternatively, the risk premium allocation subsystem 422 can charge a fee of 15% of the estimated CPA winning bid to the advertiser.

In still other implementations, the risk premium allocation subsystem 422 can allocate the risk premium by charging a subscription fee to the advertiser for using the CPA based bidding system. For example, an advertiser might sign up for a service whereby the advertiser pays $50 per month for up to 30 conversion from the CPA based bidding system.

Risk Premium Allocation Process

Figure 5:
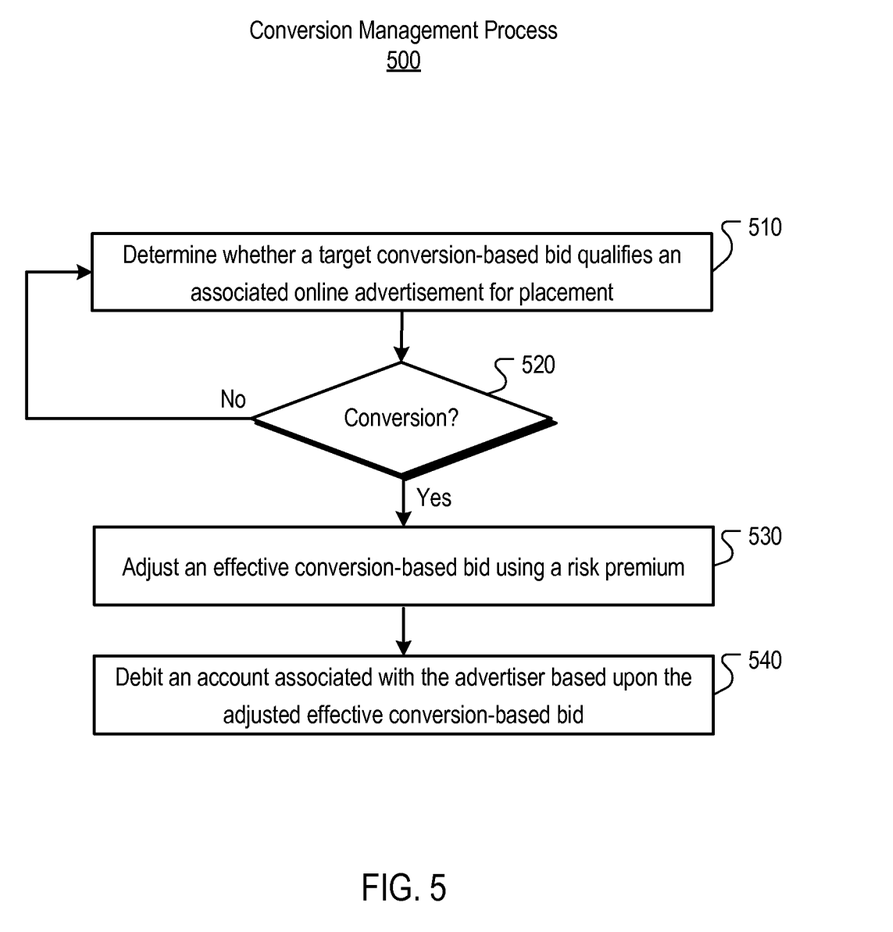
FIG. 5 is a flow diagram of an implementation of a risk premium allocation process using conversion data and ad impression context data.

FIG. 5 is a flow diagram of an implementation of a risk premium allocation process 500 using conversion data and ad impression context data. In some implementations, the process 500 begins by determining whether a target conversion based bid (e.g., CPA target, ROAS target) qualifies the advertisement for placement (510). The target conversion based bid can be derived from a maximum conversion based bid (e.g., maximum CPA bid) received from an advertiser.

In some implementations, the target conversion based bid can be derived by discounting the maximum conversion based bid by a risk premium. The determination of whether a target conversion based bid qualifies the advertisement for placement can be based upon submission of the target conversion based bid to a placement auction. In some implementations, submission of the target conversion based bid to a placement auction is facilitated by conversion of the target conversion based bid to a maximum target click based bid based upon the conversion rate for the advertisement, or maximum target impression based bid based upon the conversion rate of the advertisement and a predicted click through rate for the advertisement.

In other implementations, the target conversion based bid is identified as the maximum conversion based bid. The maximum conversion based bid can be converted to a maximum CPC or CPM based bid based upon the bidding paradigm used for the auction.

The process 500 continues by determining whether or not a conversion associated with the advertisement has occurred (520). The determination can be made, for example, based upon receiving feedback from the user computer or the advertiser computer when a transaction is made. Such feedback can be provided upon execution of one or more program code snippets causing the advertiser or user to notify an ad server when a conversion occurs. If a conversion has not occurred as a result of the placement, the process 500 returns to wait for a determination that the advertisement is eligible for another placement.

If a conversion occurs (520), an effective conversion-based bid can be adjusted based upon a risk premium (530). In those auctions using an impression based bidding paradigm, the effective conversion-based bid can be identified by dividing the winning impression based bid by an estimated CTR and an estimated conversion rate. In those auctions using a click based bidding paradigm, the effective conversion-based bid can be identified by multiplying the winning click based bid by an estimated conversion rate for the advertisement. In various implementations, the risk premium can be a fixed percentage of the effective conversion based bid, a fixed fee for each conversion, a subscription fee allocated among conversions. Other risk premiums can be used. In some implementations, the fee charged to the advertiser can be capped by the maximum conversion based bid specified by the advertiser. Thus, for example, if the advertiser specified a maximum conversion based bid of $10.00, and the effective conversion based bid was $9.50, with a risk premium of 10%, the risk premium of $0.95 would increase the cost to the advertiser over $10.00. In such examples, the risk premium can be capped at $0.50 (e.g., $10.00-$9.50=$0.50) to ensure that the cost does not exceed the maximum conversion based bid specified by the advertiser.

The process 500 continues by debiting an account associated with the advertiser based upon the adjusted effective conversion-based bid. In various implementations, the account can be a pre-paid account from which funds for the conversion are impounded, or can be a credit based account against which charges are applied and upon which the advertiser periodically makes payment to bring the account up-to-date. Other types of accounting or monetary allocation plans can be used.

The foregoing process 500 is one implementation of a risk premium allocation process. Other processes are possible, including processes with more or fewer steps. The steps of process 500 need not be performed serially in the order shown. The process 500 can be divided into multiple processing threads of one or more processor cores and/or parallel processors.

Advertising Management System Architecture

Figure 6:
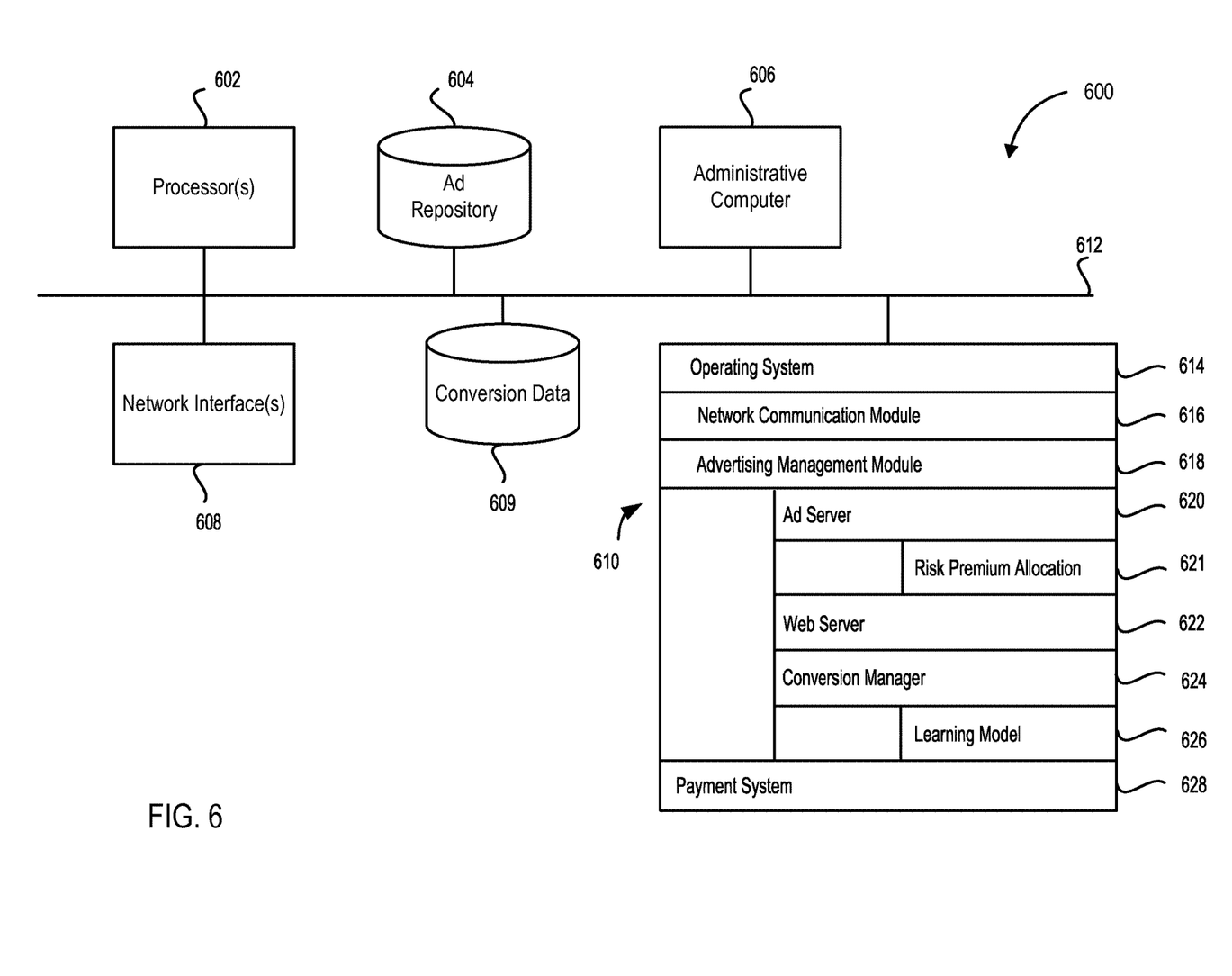
FIG. 6 is a block diagram of an implementation of an architecture for the ad management system shown in FIG. 4, which can be configured to implement the process shown in FIG. 5.

FIG. 6 is a block diagram of an exemplary architecture 600 for the ad management system 400 shown in FIG. 4, which can be configured to implement the process 500 shown in FIG. 5.

In some implementations, the architecture 600 includes one or more processors 602 (e.g., dual-core Intel® Xeon® Processors), one or more repositories 604, 609, one or more network interfaces 608, an optional administrative computer 606 and one or more computer-readable mediums 610 (e.g., RAM, ROM, SDRAM, hard disk, optical disk, flash memory, etc.). These components can exchange communications and data over one or more communication channels 612, which can include various known network devices (e.g., routers, hubs, gateways, buses) and software (e.g., middleware) for facilitating the transfer of data and control signals between devices.

The term "computer-readable medium" refers to any medium that participates in providing instructions to a processor 602 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 610 further includes an operating system 614 (e.g., Linux server, Mac OS® server, Windows® NT server), a network communication module 616, an advertising management module 618 and a payment system 628.

The operating system 614 can be multi-user, multiprocessing, multitasking, multithreading, real-time and the like. The operating system 614 performs basic tasks, including but not limited to: recognizing input from and providing output to the administrator computer 606; keeping track of files and directories on computer-readable mediums 610 (e.g., memory or a storage device); controlling peripheral devices (e.g., repositories 604 and 609); and managing traffic on the one or more communication channels 612.

The network communications module 616 includes various components for establishing and maintaining network connections (e.g., software for implementing communication protocols, such as TCP/IP, HTTP, Ethernet, etc.).

The advertising management module 618 includes an ad server 620, a web server 622 and a conversion manager 624. The conversion manager 624 further includes a learning model 626. The ad server 620 can be a server process or dedicated machine that is responsible for serving ads to publisher web properties and for tracking various information related to the ad placement (e.g., cookies, user URLs, page content, geographic information). The ad server can also include a risk premium allocation subsystem 621 operable to allocate a risk premium for advertisements using conversion based bidding for auction processes. The web server 622 (e.g., Apache web page server) serves web pages to advertisers and publishers and provides a means for advertisers and publishers to specify a target cost-per-action for use by the conversion manager 624 and its learning model 626 to dynamically compute or adjust an advertiser's click-based bid (e.g., Max CPC bid) or other performance metric, as described in reference to FIGS. 4 and 5.

The ad repository 604 can include various ads including, without limitation, image ads, text links, video and any other content that can be placed on a publisher web page and interacted with to drive users to advertiser properties.

The repository 609 can be used to store conversion data associated with an ad or ad group. The conversion data is used by the conversion manager 624 to generate a predicted conversion rate for given ad or ad group, as described in reference to FIGS. 4 and 5.

The payment system 628 is responsible for implementing a payment process, whereby advertisers pay publishers, such as is done in Google's AdSense™ service. The payment process can be fully or partially automated, and can include human intervention at one or more points in the payment process.

The disclosed embodiments can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments of the invention have been described. Nevertheless, it will be understood that various modifications may be made without departing from the spirit and scope of the invention.

What is claimed is:

1. A computer-implemented method comprising:
   determining at an advertisement management system that a specified conversion-based bid associated with an first online advertisement specified by an advertiser qualifies the first online advertisement for placement by the advertisement management system on a web property of a publisher, comprising:
     determining a risk premium to be charged to the advertiser;
     discounting the specified conversion-based bid based on the risk premium to generate a discounted specified conversion-based bid;
     converting the discounted specified conversion-based bid to an impression-based bid;
     performing an impression-based auction that includes the impression-based bid and one or more other impression-based bids;
     based on the impression based-auction, determining that the impression-based bid is a winning bid; and
     based on determining that the impression-based bid is a winning bid, determining a price to charge the advertiser in response to detecting an occurrence of a conversion event;
   providing the first online advertisement for placement on the web property of the publisher;
   crediting the publisher for the placement of the first online advertisement on the web property the price to charge the advertiser in response to detecting an occurrence of a conversion event;
   after the advertisement has been provided for placement on the web property and after the publisher has been credited for the placement, detecting an occurrence of a given conversion event for the first online advertisement; and
   in response to detecting the occurrence of the given conversion event, debiting an account associated with the advertiser with the advertisement management system for the given conversion, wherein debiting the account comprises:
     determining that the first online advertisement was qualified for placement by converting the discounted conversion-based bid to an impression-based bid and including the impression-based bid in an ad auction with the other impression-based bids,
     in response to determining that the first online advertisement was qualified for placement by converting the discounted conversion-based bid to an impression-based bid and including the impression-based bid in an ad auction with the other impression-based bids, adjusting, based on the risk premium, the price to charge the advertiser for the given conversion event, and
     debiting the account associated with the advertiser based on the adjusted price.

2. The computer-implemented method of claim 1, wherein the risk premium is based at least in part on a risk assumed by the advertisement management system for crediting the publisher for placement of the first online advertisement while waiting to charge the advertiser for conversion events for the first online advertisement.

3. The computer-implemented method of claim 1, further comprising:
   detecting an occurrence of another conversion event for a second online advertisement associated with a second advertiser; and
   in response to detecting the occurrence of the other conversion event for the second online advertisement associated with the second advertiser:
     determining that the second online advertisement was not qualified for placement by converting a conversion-based bid to an impression-based bid and including the impression-based bid in an ad auction with the other impression-based bids, and
     in response to determining that the second online advertisement was not qualified for placement by converting a conversion-based bid to an impression-based bid and including the impression-based bid in an ad auction with the other impression-based bids, debiting an account associated with the second advertiser based on a price that is not adjusted based on the risk premium.

4. The method of claim 1, wherein converting the discounted specified conversion-based bid to the impression-based bid comprises converting the discounted specified conversion-based bid using a predicted conversion rate and a predicted click-through rate associated with the auction.

5. The method of claim 4, further comprising automatically mapping one or more impression context features to the predicted conversion rate using a learning model.

6. The method of claim 5, wherein the learning model is a machine learning system model that includes rules for mapping one or more impression context features to a predicted conversion rate using conversion data.

7. The method of claim 4, further comprising:
   normalizing the predicted conversion rate to remove an effect of different conversion definitions.

8. The method of claim 1, wherein the risk premium comprises a percentage of the specified conversion-based bid.

9. The method of claim 1, wherein the risk premium comprises a fixed fee.

10. The computer-implemented method of claim 1, wherein the risk premium is less than or equal to a difference between a maximum conversion-based bid provided by the advertiser and the impression-based bid.

11. The computer-implemented method of claim 1, wherein the risk premium is based on a subscription fee charged to the advertiser and allocated across each conversion event of the advertiser.

12. A system comprising one or more computers and one or more storage devices storing instructions that when executed by the one or more computers cause the one or more computers to perform operations comprising:
   determining at an advertisement management system that a specified conversion-based bid associated with an first online advertisement specified by an advertiser qualifies the first online advertisement for placement by the advertisement management system on a web property of a publisher, comprising:
      determining a risk premium to be charged to the advertiser;
      discounting the specified conversion-based bid based on the risk premium to generate a discounted specified conversion-based bid;
      converting the discounted specified conversion-based bid to an impression-based bid;
      performing an impression-based auction that includes the impression-based bid and one or more other impression-based bids;
      based on the impression based-auction, determining that the impression-based bid is a winning bid; and
      based on determining that the impression-based bid is a winning bid, determining a price to charge the advertiser in response to detecting an occurrence of a conversion event;
   providing the first online advertisement for placement on the web property of the publisher;
   crediting the publisher for the placement of the first online advertisement on the web property the price to charge the advertiser in response to detecting an occurrence of a conversion event;
   after the advertisement has been provided for placement on the web property and after the publisher has been credited for the placement, detecting an occurrence of a given conversion event for the first online advertisement; and
   in response to detecting the occurrence of the given conversion event, debiting an account associated with the advertiser with the advertisement management system for the given conversion, wherein debiting the account comprises:
      determining that the first online advertisement was qualified for placement by converting the discounted conversion-based bid to an impression-based bid and including the impression-based bid in an ad auction with the other impression-based bids,
      in response to determining that the first online advertisement was qualified for placement by converting the discounted conversion-based bid to an impression-based bid and including the impression-based bid in an ad auction with the other impression-based bids, adjusting, based on the risk premium, the price to charge the advertiser for the given conversion event, and
      debiting the account associated with the advertiser based on the adjusted price.

13. The system of claim 12, wherein the risk premium is based at least in part on a risk assumed by the advertisement management system for crediting the publisher for placement of the first online advertisement while waiting to charge the advertiser for conversion events for the first online advertisement.

14. The system of claim 12, the operations further comprising:
   detecting an occurrence of another conversion event for a second online advertisement associated with a second advertiser; and
   in response to detecting the occurrence of the other conversion event for the second online advertisement associated with the second advertiser:
      determining that the second online advertisement was not qualified for placement by converting a conversion-based bid to an impression-based bid and including the impression-based bid in an ad auction with the other impression-based bids, and
      in response to determining that the second online advertisement was not qualified for placement by converting a conversion-based bid to an impression-based bid and including the impression-based bid in an ad auction with the other impression-based bids, debiting an account associated with the second advertiser based on a price that is not adjusted based on the risk premium.

15. The system of claim 12, wherein converting the discounted specified conversion-based bid to the impression-based bid comprises converting the discounted specified conversion-based bid using a predicted conversion rate and a predicted click-through rate associated with the auction.

16. The system of claim 15, the operations further comprising automatically mapping one or more impression context features to the predicted conversion rate using a learning model.

17. The system of claim 16, wherein the learning model is a machine learning system model that includes rules for mapping one or more impression context features to a predicted conversion rate using conversion data.

18. The system of claim 15, the operations further comprising:
   normalizing the predicted conversion rate to remove an effect of different conversion definitions.

19. The system of claim 12, wherein the risk premium comprises a percentage of the specified conversion-based bid.

20. The system of claim 12, wherein the risk premium comprises a fixed fee.

21. A computer program product encoded on one or more non-transitory computer storage media, the computer program product comprising instructions that when executed by one or more computers cause the one or more computers to perform operations comprising:
   determining at an advertisement management system that a specified conversion-based bid associated with an first online advertisement specified by an advertiser qualifies the first online advertisement for placement by the advertisement management system on a web property of a publisher, comprising:
      determining a risk premium to be charged to the advertiser;
      discounting the specified conversion-based bid based on the risk premium to generate a discounted specified conversion-based bid;
      converting the discounted specified conversion-based bid to an impression-based bid;
      performing an impression-based auction that includes the impression-based bid and one or more other impression-based bids;
      based on the impression based-auction, determining that the impression-based bid is a winning bid; and based on determining that the impression-based bid is a winning bid, determining a price to charge the advertiser in response to detecting an occurrence of a conversion event;

providing the first online advertisement for placement on the web property of the publisher;

crediting the publisher for the placement of the first online advertisement on the web property the price to charge the advertiser in response to detecting an occurrence of a conversion event;

after the advertisement has been provided for placement on the web property and after the publisher has been credited for the placement, detecting an occurrence of a given conversion event for the first online advertisement; and in response to detecting the occurrence of the given conversion event, debiting an account associated with the advertiser with the advertisement management system for the given conversion, wherein debiting the account comprises:

determining that the first online advertisement was qualified for placement by converting the discounted conversion-based bid to an impression-based bid and including the impression-based bid in an ad auction with the other impression-based bids, in response to determining that the first online advertisement was qualified for placement by converting the discounted conversion-based bid to an impression-based bid and including the impression-based bid in an ad auction with the other impression-based bids, adjusting, based on the risk premium, the price to charge the advertiser for the given conversion event, and debiting the account associated with the advertiser based on the adjusted price.

22. The computer program product of claim 21, wherein the risk premium is based at least in part on a risk assumed by the advertisement management system for crediting the publisher for placement of the first online advertisement while waiting to charge the advertiser for conversion events for the first online advertisement.

* * * * *

UNITED STATES PATENT AND TRADEMARK OFFICE
CERTIFICATE OF CORRECTION

PATENT NO. : 10,127,581 B2
APPLICATION NO. : 14/733714
DATED : November 13, 2018
INVENTOR(S) : Andrew E. Silverman Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 508 days.

Signed and Sealed this
Fourteenth Day of May, 2019

Andrei Iancu
*Director of the United States Patent and Trademark Office*